United States Patent [19]

Ishizaka et al.

[11] Patent Number: 4,655,831
[45] Date of Patent: Apr. 7, 1987

[54] METHOD OF STABILIZING A STEEL MAKING SLAG

[75] Inventors: Kunihiko Ishizaka, Chiba; Fumio Sudo, Tokyo; Akira Seki, Funabashi; Yoshio Aso, Chiba, all of Japan

[73] Assignees: Kawasaki Steel Corporation, Kobe; Kawatetsu Mining Co., Ltd., Tokyo, both of Japan

[21] Appl. No.: 837,609

[22] Filed: Mar. 7, 1986

[51] Int. Cl.$^4$ ............................................. C21B 5/04
[52] U.S. Cl. ........................................ 75/257; 75/30; 75/53
[58] Field of Search .............................. 75/257, 30, 53

[56] References Cited

U.S. PATENT DOCUMENTS

| 3,574,597 | 4/1971 | Lewis | 75/257 |
| 4,124,378 | 11/1978 | Kurdowski | 75/53 |
| 4,159,906 | 7/1979 | Meichsner | 75/53 |
| 4,175,950 | 11/1979 | Linares | 75/53 |

Primary Examiner—Peter D. Rosenberg
Attorney, Agent, or Firm—Balogh, Osann, Kramer, Dvorak, Genova & Traub

[57] ABSTRACT

A method of stabilizing a steel making slag composed mainly of dicalcium silicate is disclosed, which comprises adding a boron-containing mineral obtained by adjusting an amount of crystal water to 4–12% by weight, whereby the powdering of the slag is prevented in the cooling.

1 Claim, No Drawings

METHOD OF STABILIZING A STEEL MAKING SLAG

BACKGROUND OF THE INVENTION

1. Field of the Invention

This invention relates to a method of stabilizing a steel making slag composed mainly of dicalcium silicate, namely, a steel making slag produced in the manufacture of stainless steel, and more particularly to a method of stabilizing a steel making slag wherein the dicalcium silicate in the slag can effectively be stabilized at a state of $\beta$-type crystal to prevent the slag from powdering accompanied with crystral transformation in the cooling.

2. Related Art Statement

The slag produced in the refining of stainless steel is composed mainly of $CaO\text{-}SiO_2\text{-}MgO$ and particularly contains a large amount of dicalcium silicate having a ratio of CaO to $SiO_2$ of about 2:1 (abbreviated as $2CaO.SiO_2$ hereinafter), so that the powdering phenomenon appears in the cooling and it is impossible to use the cooled slag as ballast. Accordingly, it is an actual state that the slag has been discussed without finding its utility value.

It is known that the above $2CaO.SiO_2$ causes a crystal transformation with the change of temperature, which transforms successively from $\alpha$-type at high temperature to $\alpha'$-type, $\beta$-type and $\gamma$-type. In the usual case, the crystal transforms from $\alpha$-type→$\alpha'$-type→$\gamma$-type. In such a crystal transformation, the specific gravity of $\alpha'$-type crystal is 3.31 but that of $\gamma$-type crystal is 2.97, so that the volume expansion is about 12%, resulting in the powdering to its crystal unit.

However, if specific conditions are given to the cooling, $\alpha'$-type crystal may be transformed to $\beta$-type crystal as a semistable phase without transforming to $\gamma$-type crystal. That is, it is known that if a third component is soluted into the slag, the crystal transforms from $\alpha'$-type to $\beta$-type without substantially causing the change of the volume and the powdering.

For example, from *Handbook of Ceramic Technology*, (1973), P1628, published by Gihodo and *Refractory Technology*, (1962), P388, published by Gihodo, it is clear that $B_2O_3$, $P_2O_5$, $Cr_2O_3$ and the like, whose ionic radius being smaller than that of Si, are effective as a $\beta$-type stabilizer. Accordingly, if these stabilizers are added to the slag composed mainly of $2CaO.SiO_2$ in the manufacture of stainless steel, it is possible to prevent the slag from powdering.

In Japanese Patent laid open No. 55-128,518 based on such a finding, there is proposed a method wherein the powdering of the slag is prevented by adding 0.4–5% by weight of $B_2O_3$ to molten slag produced in the manufacture of stainless steel and cooling the resulting mixture to 300° C. at a cooling rate of not less than 22° C./min.

For example, in the above article of *Handbook of Ceramic Technology*, there is generally described that the crystal transformation to $\beta$-type can sufficiently be caused by merely adding 0.3% by weight of $Ca_3(BO_3)_2$, coresponding to 0.088% by weight as a conversion value into $B_2O_3$, from which it is naturally apparent that the powdering of the slag may be prevented even if the addition amount of $B_2O_3$ is slight. In this connection, the above Japanese Patent laid open No. 55-128,518 discloses that boron-containing mineral is excessively added, which means to be due to the fact that the diffusion and the yield of $B_2O_3$ are poor. Therefore, such a technic should be improved, considering the fact that the boron-containing mineral is expensive because it is scarcely mined in Japan and is dependent upon the importation from foreign countires.

The size of $2CaO.SiO_2$ crystal in the slag composed mainly of the above dicalcium silicate is usually fine within a range of from several microns to about several tens microns. Therefore, when molten slag is stabilized with boron-containing mineral (stabilizer), unless the stabilizer is sufficiently and uniformly diffused into the slag containing crystals of not more than several tens microns, the given effect can not be obtained. However, it is difficult to diffuse the stabilizer into the slag containing the crystal of micron order to even by mechanical agitation because molten slag is a so-called viscous liquid. Consequently, the stabilizer added is partially concentrated and diluted in the slag, resulting in the formation of a powdering portion and a lumping portion containing a $\beta$-type and $\gamma$-type mixture after the cooling. On the other hand, even if the stabilizer is rendered into a micron size, the addition of powdery stabilizer to the viscous slag is finally caused, so that the same concentrated and diluted portions as mentioned above are produced to make uniform diffusion difficult.

SUMMARY OF THE INVENTION

The inventors have aimed at the fact that since water produces extremely large pressure at high temperature, if the stabilizer added is surrounded with high temperature molten slag, the pressure produced by water can effectively be utilized as an explosive function.

According to the invention, therefore, there is the provision of a method of stabilizing a steel making molten slag composed mainly of dicalcium silicate by adding a boron-containing mineral to the slag for preventing the slag from powdering in cooling, which comprises adding a boron-containing mineral obtained by adjusting an amount of crystal water to 4–12% by weight.

DETAILED DESCRIPTION OF THE INVENTION

According to the invention, a given amount of water is entrained into the boron-containing mineral to be added as a stabilizer. In this case, it is insufficient to only surround the surface of the mineral with water or to merely wet the surface with water, while water contained in the mineral must be first released from the mineral when the temperature reaches a high temperature, because in case of the wetting form, water is instantaneously evaporated by the radiant heat of high temperature molten slag just before the addition of the stabilizer and consequently when molten slag surrounds the stabilizer, most water is already lost to provide an effective explosive diffusion function. On the contrary, crystal water is vaporized at a temperature of several hundreds °C., so that water is sufficiently held in the mineral until the stabilizer is surrounded by molten slag and is first released therefrom at a temperature for removing crystal water. In this case, water vapor already arrives to several hundreds atmosphere at this temperature, which effectively acts to the explosive diffusion function aiming at in the invention. Conveniently, the diffusion is more accelerated because the additive becomes scattered by losing its original crystal form.

According to the invention, as the material to be added as a stabilizer, there may be considered $B_2O_3$-containing mineral, $P_2O_5$-containing mineral and $Cr_2O_3$-containing mineral. Among them, however, the minerals having crystal water and being comparatively available are restricted to $B_2O_3$-containing mineral. That is, it includes borax ($Na_2O.2B_2O_3.10H_2O$), kernite ($Na_2O.2B_2O_3.4H_2O$), colemanite ($2CaO.3B_2O_3.5H_2O$), soda colemanite ($2CaO.Na_2.5B_2O_3.16H_2O$) and the like, which have amounts of crystal water of 47.2%, 26.3%, 21.9% and 35.5%, respectively.

However, when the above boron-containing mineral is used as it is, blowing-up force of water vapor becomes strong due to excess crystal water, resulting in the blowing off of the additive, the reduction of the addition yield, and the deterioration of the working environment. Therefore, according to the invention, it has been found from the results of various experiments that it is effective to previously heat the additive to a temperature of 500°–600° C. so as to adjust the remaining amount of crystal water within a range of 4–12%. The reason why the amount of crystal water is restricted to a range of 4–12% is due to the fact that when the amount is less than 4%, the addition yield becomes high but the explosive diffusion is weak and the additive is not sufficiently diffused into individual crystal units and thus the uniform stabilization becomes difficult, while, when the amount exceeds 12%, the explosive diffusion is too strong and hence the blown-off amount of the additive is large to reduce the addition yield.

The following example is given in the illustration of the invention and is not intended as limitations thereof.

EXAMPLE

Powder colemanite (chemical formula; $2CaO.3B_2O_3.5H_2O$, amount of crystal water; 22.5%) was heated at a temperature of 550° C. by means of a belt type indirect heating furnace to prepare samples having amounts of water of crystallization of 2%, 4%, 7%, 12% and 15%, respectively. Each of the samples was previously placed in a slag pot, into which was poured about 12 tons of stainless steel making slag at about 1,600° C. After about one hour, the stabilized stainless steel making slag was taken off through a cooling yard and then left to stand for natural cooling. Thereafter, the properties of the stabilized slag were measured to obtain results as shown in Table 1.

TABLE 1

Results of Sabilizing Test

| Crystal water remaining in colemanite (%) | Addition amount (conversion to $B_2O_3$) (%) | State at the addition | State of slag after cooling | Amount of $B_2O_3$ in slag (%) | Addition yield | Basicity of slag $CaO/SiO_2$ |
|---|---|---|---|---|---|---|
| 2 | 0.21 | calm | Powdering portion and gravel portion | 0.21 | 100 | 1.88 |
| 4 | 0.20 | somewhat waving | 100% lump | 0.16 | 80 | 1.80 |
| 7 | 0.23 | Violently waving and good diffusing | 100% lump | 0.15 | 67 | 2.05 |
| 12 | 0.25 | Violently waving and dust-producing | 100% lump | 0.13 | 57 | 1.85 |
| 15 | 0.27 | Violently dust-whirling up | Nearly 50% powdering and 50% lump | 0.10 | 37 | 1.81 |

As seen from the above examples, when the remaining amount of crystal water is less than 4%, the addition yield is good, but the diffusion is poor, resulting in the uneven distribution of two portions containing larger and smaller amounts of $B_2O_3$ respectively, which finally form the powdering portion and the lampy portion of about small gravell. While, when the amount exceeds 12%, the explosive diffusion is too strong to blow off the additive and the addition yield was poor to conduct the powdering of the slag.

As mentioned above, according to the invention, the boron-containing mineral can uniformly be diffused into the slag, so that the powdering is effectively prevented with a smaller amount of the stabilizer. Further, the slag is stabilized with a small amount of an expensive stabilizer, and resource-saving is attained from a viewpoint of slag reuse.

What is claimed is:

1. A method of stabilizing a steel making molten slag composed substantially of dicalcium silicate comprising the step of adding a boron-containing mineral to the slag to prevent the powdering of the slag during cooling, said boron-containing mineral being selected from the group consisting of borax, kernite, colemanite and soda colemanite and containing crystal water is an amount of 4 to 12% by weight.

* * * * *